(12) United States Patent
Mae et al.

(10) Patent No.: US 7,452,931 B2
(45) Date of Patent: Nov. 18, 2008

(54) VISCOSITY MODIFIER FOR PLASTISOL COMPOSITION, PLASTISOL COMPOSITION, AND PRODUCT AND MOLDED ARTICLE EACH OBTAINED THEREFROM

(75) Inventors: Satoshi Mae, Hiroshima (JP); Katsumi Yonekura, Aichi (JP); Toshihiro Kasai, Hiroshima (JP); Shinji Saiki, Aichi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 507 days.

(21) Appl. No.: 10/520,254

(22) PCT Filed: Jul. 11, 2003

(86) PCT No.: PCT/JP03/08837

§ 371 (c)(1), (2), (4) Date: Aug. 22, 2005

(87) PCT Pub. No.: WO2004/007605

PCT Pub. Date: Jan. 22, 2004

(65) Prior Publication Data

US 2006/0014868 A1 Jan. 19, 2006

(30) Foreign Application Priority Data

Jul. 11, 2002 (JP) ............... 2002-202431
May 9, 2003 (JP) ............... 2003-131633

(51) Int. Cl.
*C08K 5/09* (2006.01)

(52) U.S. Cl. ............... 524/301; 524/236; 524/556; 524/560; 524/561

(58) Field of Classification Search ............... 524/236, 524/301, 556, 560, 561
See application file for complete search history.

(56) References Cited

U.S. PATENT DOCUMENTS

| | | | | |
|---|---|---|---|---|
| 2,548,433 A | * | 4/1951 | Klein et al. | 524/96 |
| 3,210,312 A | * | 10/1965 | Rosenberg et al. | 524/106 |
| 3,301,798 A | * | 1/1967 | Waterman et al. | 521/74 |
| 3,409,580 A | * | 11/1968 | Alzner et al. | 524/251 |
| 3,492,257 A | * | 1/1970 | Meyer et al. | 524/238 |
| 3,649,443 A | | 3/1972 | Domicone | |
| 3,730,943 A | * | 5/1973 | Welsfeld et al. | 523/100 |
| 3,835,116 A | | 9/1974 | Lydick | |
| 3,890,267 A | * | 6/1975 | Fukushima et al. | 524/151 |
| 4,613,639 A | * | 9/1986 | Blum et al. | 524/251 |
| 2004/0167253 A1 | | 8/2004 | Butschbacher | |

FOREIGN PATENT DOCUMENTS

| | | | |
|---|---|---|---|
| GB | 926902 | | 5/1963 |
| GB | 926902 A | * | 5/1963 |
| JP | 61-250070 | | 11/1986 |
| JP | 04-337345 | | 11/1992 |
| JP | 07-207100 | | 8/1995 |
| JP | 09-216984 | | 8/1997 |
| JP | 10-505373 | | 5/1998 |
| JP | 2000-212237 | | 8/2000 |
| JP | 2001-187834 | | 7/2001 |
| SU | 960205 | * | 9/1982 |
| WO | 00/01748 | | 1/2000 |
| WO | WO 03/002645 A1 | | 1/2003 |

OTHER PUBLICATIONS

SU 960205, Derwent Abstract, Gorshkov et al., Sep. 23, 1982.*

* cited by examiner

*Primary Examiner*—Bernard Lipman
(74) *Attorney, Agent, or Firm*—Oblon, Spivak, McClelland, Maier & Neustadt, P.C.

(57) ABSTRACT

A viscosity modifier for plastisol compositions which contains at least one selected from the group consisting of: (A) a compound having at least one of a carboxy group or a salt thereof, an alkoxy group, and a glycidyl group; (B) amine compounds; and (C) metal chelate compounds. A plastisol composition containing the viscosity modifier and a polymer. A product having a coating layer obtained from the composition. A molded product obtained by using the composition. This viscosity modifier has an excellent effect of decreasing viscosity of a plastisol composition, thus enabling acquisition of a plastisol composition which allows an excellent cured product to be obtained at a low cost.

19 Claims, No Drawings

VISCOSITY MODIFIER FOR PLASTISOL COMPOSITION, PLASTISOL COMPOSITION, AND PRODUCT AND MOLDED ARTICLE EACH OBTAINED THEREFROM

TECHNICAL FIELD

The present invention relates to a plastisol composition used for forming a film or a molded product, and also relates to a viscosity modifier for adjusting the viscosity of a plastisol composition. Further, the present invention relates to a product or a molded product having a covering layer obtainable from a plastisol composition.

BACKGROUND ART

Plastisol having polymer particles dispersed in a plasticizer as a medium is used in a wide range of industries, and its industrial value is remarkable. Plastisol using the most common vinyl chloride polymer is known as vinyl chloride sol, and it is used in a broad range of fields, such as vehicle undercoats, vehicle body sealers, carpet backing materials, wallpaper, floorings, paints, and disposable gloves, due to its excellent physical properties.

A variety of performances are required for plastisol, and one of them is low viscosity. When plastisol has low viscosity, the speed of passing through processes can be improved and the amount of an extender to be blended can be increased, resulting in lower production costs.

In recent years, it has been pointed out that vinyl chloride polymers commonly used in plastisol have possibility to generate harmful hydrogen chloride gas and dioxin depending upon a disposal and incineration method. As a material to overcome this problem, acrylsol having acrylic polymers dispersed in a plasticizer is proposed in Japanese Patent Laid-Open No. 9-216984 and WO 00/01748.

The acrylic polymer and acrylsol described in these documents satisfy fundamental performances required for plastisol, that is, viscosity stability during storage and plasticizer-retaining property of molded articles or cured films after being heated and cured. However, they still have a problem in that their viscosity is higher than that of vinyl chloride sol. Thus, there is further increasing demand for techniques of decreasing viscosity.

As a method for decreasing the viscosity of plastisol, a method of increasing the amount of a plasticizer is generally considered. However, a cured plastisol product containing a higher amount of a plasticizer may cause more bleeding out of the plasticizer, and the mechanical strength may decline.

Further, a diluent used for decreasing the viscosity of plastisol is unfavorable from the viewpoint that organic matters vaporize during molding.

Hence, a low viscosity acrylsol containing hydroxy fatty acid/polyhydric alcohol ester is proposed in Japanese Patent Laid-Open No. 2001-187834.

The hydroxy fatty acid/polyhydric alcohol ester described in Japanese Patent Laid-Open No. 2001-187834 has a low effect of decreasing viscosity depending upon a plasticizer selected, and higher viscosity decreasing effect is required particularly for di-2-ethylhexyl phthalate or diisononyl phthalate that are cheap and used widely. In addition, coloring derived from hydroxy fatty acid/polyhydric alcohol ester is sometimes observed in obtained film or molded product.

DISCLOSURE OF THE INVENTION

An object of the present invention is to provide a plastisol composition, which (1) has low viscosity, (2) causes no color on a cured product, (3) allows the cured product to have good mechanical strength, and (4) can prevent volatilization of organic matters.

Another object of the present invention is to provide a viscosity modifier for a plastisol composition, which (1) has a good viscosity decreasing effect, (2) can avoid being a cause for coloring, and (3) has a viscosity decreasing effect not affected by the type of a plasticizer.

A further object of the present invention is to provide a product or a molded product having a covering layer obtainable from the plastisol composition, which can be prepared at a low cost.

The present invention provides a viscosity modifier for a plastisol composition containing at least one selected from the group consisting of compounds (A) to (C):
(A) a compound having at least one selected from the group consisting of the following groups (A1) to (A3):
  (A1) a carboxyl group or a salt thereof;
  (A2) an alkoxy group; and
  (A3) a glycidyl group,
(B) an amine compound; and
(C) a metal chelate compound.

The above compound (B) is preferably an alkylamine compound (B1).

The alkylamine compound (B1) is preferably at least one alkylamine compound selected from a compound represented by formula (1) and a compound represented by formula (2):

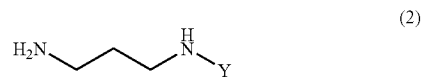

wherein Y represents an alkyl group having 4 to 28 carbon atoms, and V and X each independently represent a hydrogen atom or an alkyl group having 1 to 28 carbon atoms.

The alkylamine compound (B1) is preferably an alkylamine compound represented by formula (3):

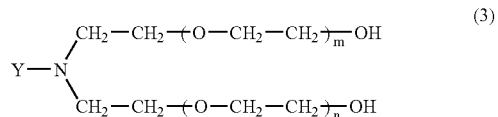

wherein Y represents an alkyl group having 4 to 28 carbon atoms, and m and n each independently represent an integer of 0 to 10.

The compound (B) is preferably an imidazoline compound (B2) represented by formula (4):

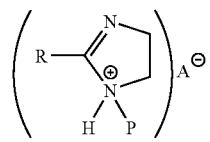

wherein R represents an alkyl group having 4 to 28 carbon atoms or an alkenyl group having 4 to 28 carbon atoms, P represents an alkyl group having 1 to 10 carbon atoms or a hydroxyalkyl group having 1 to 10 carbon atoms, and A represents an anion.

The metal chelate compound (C) is preferably at least one metal chelate compound selected from the group consisting of an aluminum chelate compound, a titanium chelate compound and a zirconium chelate compound.

The present invention provides a plastisol composition containing the above viscosity modifier.

The plastisol composition preferably contains an acrylic polymer.

According to the present invention, there is provided a product having a covering layer obtained by using the above plastisol composition.

According to the present invention, there is provided a molded article molded by using the above plastisol composition.

BEST MODE FOR CARRYING OUT THE INVENTION

The present invention will hereinafter be described in detail.

A compound (A) usable for the present invention contains at least one group of the following (A1) to (A3):

(A1) a carboxyl group or a salt thereof;
(A2) an alkoxy group; and
(A3) a glycidyl group.

Examples of compounds having a carboxyl group mentioned in (A1) above include carboxylic acids such as octylic acid, stearic acid, myristic acid, nonylic acid, oleic acid, and lauric acid.

In addition, examples of compounds having a group derived from a salt of a carboxyl group include zinc octylate and sodium laurate.

As a compound having a substituent of (A2), a metal alkoxide is preferably used. Specific examples of the metal alkoxide include zirconium alkoxides such as tetrapropylzirconium and tetra-n-butylzirconium, titanium alkoxides such as tetrapropyltitanate and tetra-n-butyltitanate, and aluminum alkoxides such as tetrapropylaluminium and tetra-n-butylaluminum.

As compounds having a substituent of (A3), usable are glycidyl alkyl ethers such as 2-ethylhexyl glycidyl ether, stearyl glycidyl ether, and allyl glycidyl ether.

Specific examples of the amine compounds (B) usable in the present invention include: primary aliphatic amines such as dodecylamine, tetradecylamine, and octadecylamine; secondary aliphatic amines such as di-2-ethylhexylamine, dicocoalkylamine, and dioleylamine; tertiary aliphatic amines such as dodecyldimethylamine, octadecyidimethylamine, and dioleylmethylamine; alkyldiamine such as N-cocoalkyl-1,3-diaminopropane and N-oleyl-1,3-diaminopropane; aromatic amine derivatives; alicyclic amine derivatives; polyoxyethylene alkylamines; and imidazole derivatives.

Among these, alkylamine compounds (B1) are preferable in terms of a viscosity decreasing effect. At least one of the alkylamine compounds represented by the following formulas (1), (2) or (3) is particularly preferable.

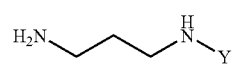

wherein Y represents an alkyl group having 4 to 28 carbon atoms, and V and X each independently represent a hydrogen atom or an alkyl group having 1 to 28 carbon atoms.

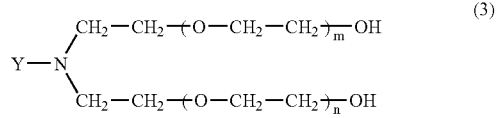

wherein Y represents an alkyl group having 4 to 28 carbon atoms, and m and n each independently represent an integer of 0 to 10.

Herein, when a plurality of compounds represented by the formulas (1) to (3) are used, Y of each formula may be the same or different.

Among them, in particular, the upper and lower limits of carbon number for X, Y and V are preferably 26 and 6, respectively. A viscosity modifier using an amine compound wherein X, Y and V each have 26 or less carbon atoms tends to be liquid at room temperature, and tends to be easily handled during plastisol blending. In addition, a viscosity modifier using an amine compound wherein X, Y and V each have 6 or more carbon atoms tends to exhibit a better viscosity decreasing effect.

Further, in the formula of the alkylamine compound represented by the formula (3), m and n are preferably 8 or less. When they are 8 or less, a viscosity modifier tends to become liquid at room temperature and tends to be easily handled during plastisol blending.

It is particularly preferable that an imidazoline compound (B2) usable in the present invention has a structure represented by the formula (4) described below in terms of viscosity decreasing effect.

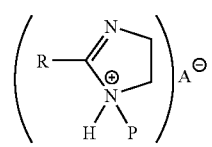

wherein R represents an alkyl group having 4 to 28 carbon atoms or alkylene group having 4 to 28 carbon atoms, P represents an alkyl group having 1 to 10 carbon atoms or hydroxyalkyl group having 1 to 10 carbon atoms, and A represents an anion.

Among them, in particular, the upper limit of carbon number for alkyl group or alkylene group of R is preferably 26 and the lower limit thereof is preferably 6. When a viscosity modifier is prepared using an imidazoline compound wherein the carbon number of R is not greater than 26, the viscosity modifier tends to be liquid at room temperature and easily handled during plastisol blending. When a viscosity modifier is prepared using an imidazoline compound wherein R has a carbon number of not less than 6, the viscosity modifier tends to exhibit better viscosity decreasing effect.

The upper limit of carbon number for an alkyl or hydroxyalkyl group of P is preferably 8. When an imidazoline compound wherein P has 8 or less carbon atoms is used, a viscosity modifier using the same tends to be liquid at room temperature and easily handled at the time of plastisol blending.

Specific examples of the anion A include $F^-$, $Cl^-$, $Br^-$, $HCO_3^-$, $NO_2^-$, and $NO_3^-$. Among these, $Cl^-$ is preferable.

The metal chelate compound (C) usable in the present invention is a compound wherein a polyvalent metal is linked to an organic compound through covalent bond or coordinate bond. Examples of the polyvalent metal atom include Al, Zr, Co, Cu, Fe, Ni, V, Zn, In, Ca, Mg, Mn, Y, Ce, Sr, Ba, Mo, La, Sn and Ti. Among these, Al, Zr and Ti are preferable in terms of viscosity decreasing effect, and Al is more preferable from the viewpoint that the resulting molded product exhibits good transparency. Further, as an atom in the organic compound to be linked via a covalent or coordinate bond, an oxygen atom or the like may be mentioned. As the organic compound, there are mentioned alkyl esters, alcohol compounds, carboxylic acid compounds, ether compounds, keton compounds and the like. These polyfunctional metal chelates react with the surface of polymer in a plastisol composition, and the particle surface is modified, thereby exhibiting an excellent viscosity decreasing effect in the plastisol composition.

Specific examples of the metal chelate compounds (C) include: zirconium chelate compounds, such as zirconium tri-n-butoxy acetylacetonate, zirconium tri-n-butoxy ethylacetoacetate, zirconium di-n-butoxy bis(ethylacetoacetate), zirconium n-butoxy tris(ethylacetoacetate), zirconium tetrakis (n-propylacetoacetate), zirconium tetrakis(acetylacetonate), and zirconium tetrakis(ethylacetoacetate); titanium chelate compounds such as titanium di-i-propoxy bis(ethylacetoacetate), titanium di-i-propoxy bis(acetylacetonate), and titanium di-i-propoxy bis(acetylacetonate); aluminum chelate compounds such as aluminum di-i-propoxy ethylacetoacetate, aluminum di-i-propoxy acetylacetonate, aluminum i-propoxy bis(ethylacetoacetate), aluminum i-propoxy bis (acetylacetonate), aluminum tris(ethylacetoacetate), aluminum tris(acetylacetonate), and aluminum monoacetylacetonate bis(ethylacetoacetate). Other than the above, usable as the metal chelate compounds (C) are metal alkoxides having similar structure including zirconium alkoxide compounds such as tetrapropylzirconium and tetra-n-butylzirconium; titanium alkoxide compounds such as tetrapropyl titanate and tetra-n-butyl titanate; and aluminum alkoxide compounds such as tetrapropyl aluminum and tetra-n-butyl aluminum.

Among these compounds, an aluminum chelate compound selected from aluminum di-i-propoxy ethylacetoacetate, aluminum tris(acetylacetonate), and aluminum monoacetylacetonato bis(ethylacetoacetate) is preferable in terms of a good viscosity decreasing effect, good stability and easy handling.

A viscosity modifier is preferably added to a plastisol composition so that the total content of compounds (A) to (C) in the viscosity modifier is 0.0001 parts by mass or more, and more preferably 0.005 parts by mass or more, with respect to 100 parts by mass of the polymer. Further, the total content is preferably 30 parts by mass or less, and more preferably 10 parts by mass or less, with respect to 100 parts by mass of the polymer.

When the added content is 0.0001 parts by mass or more, the viscosity modifier tends to exhibit an excellent viscosity decreasing effect in the obtained plastisol composition. Therefore, it becomes a suitable plastisol composition, when a calendaring or slush molding method or the like is employed, which requires low viscosity plastisol. Further, it becomes easier to increase blending amount of an extender and to prevent bleeding out by decreasing an amount of a plasticizer.

On the other hand, when the added content is 30 parts by mass or less, a molded article obtained by using the plastisol composition tends to have good yellowing resistance and mechanical strength. Therefore, it is suitable for such applications as wall paper, paints, toys, wherein importance is attached to design or yellowing resistance; cases wherein transparent molded products or films are obtained; and cases wherein particularly high strength is required, such as toys and gloves.

The compounds (A) to (C) may be dissolved in a plasticizer, a solvent or a diluent, and the resultant products can be used as a viscosity modifier. Or the compounds (A) to (C) can be directly used as a viscosity modifier.

A plasticizer to be blended into a viscosity modifier may be selected from well-known plasticizers as appropriate.

Specific examples of the plasticizer include phthalate ester plasticizers such as dimethyl phthalate, diethyl phthalate, dibutyl phthalate, diheptyl phthalate, di-2-ethylhexyl phthalate, di-n-octyl phthalate, diisononyl phthalate, diisodecyl phthalate, and butylbenzyl phthalate; adipate ester plasticizers such as dimethyl adipate, dibutyl adipate, diisobutyl adipate, dihexyl adipate, di-2-ethylhexyl adipate, diisononyl adipate, and dibutyldiglycol adipate; phosphate ester plasticizers such as trimethyl phosphate, triethyl phosphate, tributyl phosphate, tri-2-ethylhexyl phosphate, tributoxyethyl phosphate, triphenyl phosphate, tricresyl phosphate, trixylenyl phosphate, and cresylphenyl phosphate; trimellitate ester plasticizers such as tri-2-ethylhexyltrimellitate; sebacate ester plasticizers such as dimethyl sebacate, dibutyl sebacate, and di-2-ethylhexyl sebacate; aliphatic polyester plasticizers such as poly-1,3-butanediol adipate; epoxidized ester plasticizers such as epoxidized soybean oil; phenyl alkylsulfonate ester plasticizers such as phenyl alkylsulfonate ester; alicyclic dibasic acid ester plasticizers; polyether plasticizers such as polypropylene glycol and polybutylene glycol; and acetyl tributyl citrate.

A solvent or a diluent to be blended into a viscosity modifier may be selected from well-known plasticizers for use as appropriate.

Specific examples (trade names) of the diluent include aromatic diluents such as Solvesso 100 (available from Exxon Chemical, Ltd.), Solvesso 150 (available from Exxon Chemical, Ltd.), and Mineral Spirit A (available from Nippon Oil Corporation); and aliphatic diluents such as Isopar C (available from Exxon Chemical, Ltd.), Isoper E (available from Exxon Chemical, Ltd.), Isoper G (available from Exxon Chemical, Ltd.), Isoper H (available from Exxon Chemical, Ltd.), Isoper L (available from Exxon Chemical, Ltd.), No. 0 Solvent L (Nippon Oil Corporation), No. 0 Solvent M (Nippon Oil Corporation), No. 0 Solvent H (Nippon Oil Corporation), Tekleen N-16 (Nippon Oil Corporation), Tekleen N-20 (Nippon Oil Corporation), and Tekleen N-22 (Nippon Oil Corporation).

The contents of compounds (A) to (C) in a viscosity modifier may be properly adjusted as required. However, the addition of a plasticizer, a solvent or a diluent may dissolve polymers. This may result in increase of plastisol viscosity during storage or reduction of the transparency of a molded product of plastisol, and thus it is preferable that the total content of (A) to (C) is not less than 20 mass % in the total amount of the viscosity modifier.

As a plasticizer, a solvent or diluent, those which neither dissolve polymers nor reduce the transparency of a molded product are preferably selected from well-known substances.

Two or more kinds of the compounds (A) to (C) may be mixed and used as required. The blending quantity thereof may be properly adjusted as desired.

A plasticizer is used for a plastisol composition. A plasticizer may be appropriately selected for use from well-known plasticizers as used in the viscosity modifier for dilution.

Plasticizer may be used alone or in combination of two or more kinds by mixing, as needed, and the blending quantity thereof may be adjusted as desired.

In a plastisol of the present invention, the content of the plasticizer is preferably not less than 50 parts by mass and more preferably not less than 70 parts by mass, with respect to 100 parts by mass of polymer. In addition, the content thereof is preferably not greater than 1,000 parts by mass, and more preferably not greater than 150 parts by mass.

A plastisol composition having a plasticizer content of not greater than 1,000 parts by mass tends to hardly suffer bleeding out of plasticizer from a film after film formation. Further, a plastisol composition having a plasticizer content of not less than 50 parts by mass tends to exhibit excellent viscosity decreasing effect.

A polymer used for the present invention may be selected from well-known polymers used for plastisols, as appropriate.

The polymer is preferably in the shape of a particle and the volume average particle diameter thereof is preferably in the range of not less than 0.1 µm and not greater than 500 µm. The volume average particle diameter of not less than 0.1 µm is preferable in terms of storage stability of plastisol composition. The diameter of not greater than 500 µm is preferable from the viewpoint that particles are not precipitated but dispersed stably.

As a method for producing the polymer, a method may be selected from well-known polymer production methods as appropriate. For example, to obtain the polymer, latex obtained by a polymerization method such as emulsion polymerization method, soap-free polymerization method, suspension polymerization method, microsuspension polymerization method and dispersion polymerization method, is turned into powder by well-known methods such as (wet) coagulation method and spray drying method.

The polymer may be selected for use from well-known resins used for plastisol, as appropriate.

A plastisol composition containing (meth)acrylic polymer as the resin is preferable, from the viewpoint that 1) it causes no emission of harmful gases during incineration and 2) it is easy to balance viscosity stability during storage with plasticizer-retaining property of a molded product or cured film. A viscosity modifier of the present invention suitably exhibits a viscosity decreasing effect in a plastisol composition containing (meth)acrylic polymer, but it also suitably exhibits a viscosity decreasing effect when the resin is vinyl chloride resin or styrene resin. Accordingly, vinyl chloride resin or styrene resin may be used as the resin.

A (meta)acrylic polymer means an acrylate polymer and/or a methacrylate polymer, and it is obtained from a monomer having a methacryloyl group and/or an acryloyl group. It may be a homopolymer polymerized from sole monomers or a copolymer polymerized from two or more kinds of monomers.

The polymer preferably has a weight average molecular weight of 10,000 or more and 5,000,000 or less. When the weight average molecular weight thereof is 10,000 or more, it is preferable from the viewpoint of storage stability and strength of a plastisol composition. When the weight average molecular weight is 5,000,000 or less, it is preferable from the viewpoint of gelation during film forming by heating.

A monomer used for obtaining a (meth)acrylic polymer may be selected from well-known monomers having methacryloyl group and/or acryloyl group as appropriate. Specific examples of the monomer include acrylonitrile; (meth)acrylates of straight-chain alkyl alcohols such as methyl (meth) acrylate, ethyl (meth)acrylate, n-butyl (meth)acrylate, i-butyl (meth)acrylate, t-butyl (meth)acrylate, hexyl (meth)acrylate, 2-ethylhexyl (meth)acrylate, and octyl (meth)acrylate; (meth)acrylates of cyclic alkyl alcohols such as cyclohexyl (meth)acrylate; monomers containing a carboxyl group, such as methacrylic acid, acrylic acid, 2-succinoloyloxyethyl-2-methacryloyloxyethylsuccinic acid methacrylate, 2-maleinoloyloxyethyl-2-methacryloyloxyethylmaleic acid methacrylate, 2-phthaloyloxyethyl-2-methacryloyloxyethylphthalic acid methacrylate, and 2-hexahydrophthaloyloxyethyl-2-methacryloyloxyethyl-hexahydrophthalic acid methacrylate; (meth)acrylates containing a sulfonic acid group, such as allylsulfonic acid; (meth)acrylates containing a phosphoric acid group, such as 2-(meth)acryloyxyethyl acid phosphate; (meth)acrylates containing a hydroxyl group, such as 2-hydroxyethyl (meth) acrylate and 2-hydroxypropyl (meth)acrylate; (meth)acrylates containing a carbonyl group, such as acetoacetoxyethyl (meth)acrylate; (meth)acrylates containing an amino group, such as N-dimethylaminoethyl (meth)acrylate and N-diethylaminoethyl (meth)acrylate; acrylamide derivatives such as acrylamide diacetone acrylamide, N-methylol acrylamide, N-methoxymethyl acrylamide, N-ethoxymethyl acrylamide, and N-butoxymethyl acrylamide; and polyfunctional (meth) acrylates such as (poly)ethylene glycol di(meth)acrylate, propylene glycol di(meth)acrylate, 1,6-hexanediol di(meth) acrylate, and trimethylolpropane tri(meth)acrylate.

In addition to monomers having a methacryloyl group and/or acryloyl group, copolymerization may be carried out, if necessary, using, for example, styrene derivatives such as styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, and p-phinylstyrene; polyfunctional monomers such as divinyl benzene, divinyl naphthaline, and divinyl eter; itaconic acids; crotonic acids; maleic acid derivatives, such as maleic acid, maleic acid ester, and maleic anhydride; fumaric acid derivatives, such as fumaric acid and fumaric acid ester; and tri-aryl isocyanulate.

The particle structure of the polymer may be selected from well-known structures as appropriate, and, for example, a uniform structure, a core/shell structure with 2 or more layers, or the like may be employed.

Among them, a core/shell structure wherein each layer has a different composition is preferable, since additional physical properties can be incorporated into a plastisol, as needed.

Usable is a polymer wherein, for example, a secondary particle structure may be formed by aggregating primary particles obtained by polymerization, or a higher-order particle structure may be formed. As for an aggregation state in such case, it is preferable that primary particles are not strongly bound but loosely aggregated. This is because excellent dispersion stability of primary particles in a plasticizer and fine and uniform dispersion can be accomplished.

A plastisol composition of the present invention may, as needed, further contain fillers such as calcium carbonate, aluminum hydroxide, pearlite, clay, colloidal silica, mica powder, silica sand, diatomaceous earth, kaolin, talc, bentonite, glass powder, aluminum oxide, fly ash, and Shirasu-balloons, as far as the advantages of the present invention are not ruined.

As far as the advantages of the present invention are not ruined, the plastisol composition may contain various additives as appropriate, for example, pigments such as titanium oxide and carbon black, as well as defoaming agents, fungicides, deodorants, antibacterial agents, surfactants, lubricants, ultraviolet absorbers, fragrances, foaming agents, leveling agents, and adhesives. In addition, it is possible to further reduce the viscosity by mixing a diluent such as mineral turpentine and mineral spirit, though there is a demand for reducing their use due to the above-mentioned reasons.

A method for preparing a plastisol composition may be selected for use from well-known methods as appropriate.

For instance, a polymer and, if necessary, other additives may be mixed into a mixture having a viscosity modifier dispersed in advance in a plasticizer. Or the plasticizer, polymer and, if necessary, other additives are mixed in advance, and then the viscosity modifier is blended therein for mixing. All the components may be blended at once and dispersed.

Further, it is possible to provide the viscosity modifier to the polymer in advance, for example, by adding the viscosity modifier into latex in which polymers have been polymerized, and then spray-drying the latex.

Equipment for preparing a plastisol composition may be selected for use from well-known equipment as appropriate.

Examples of the equipment include a Pony mixer, a change-can mixer, a Hobert mixer, a planetary mixer, a butterfly mixer, a stone mill, and a kneader.

A plastisol composition may be used as a covering material and a molding material, and coating and molding methods are not particularly limited.

Examples of methods for applying a plastisol composition onto a base material include a dip coating method, a spray coating method, a knife coating method, a roll coating method, a curtain flow coating method, a brush application method, and an electrostatic coating method. When a coating of plastisol is gelated by heating to form a film, a product with an intended coating layer may be obtained.

Further, as a method for molding a plastisol composition; there may be mentioned dip molding method, cast molding method, splash molding method, and rotational molding method.

In view of the foregoing, use of a plastisol of the present invention may provides covering materials such as wall paper, polyvinyl chloride coated steel sheets, covering materials for automobiles, and molded materials such as vinyl leather, dolls, toys, gloves, floorings, sponge products, automotive parts, and industrial machinery parts.

The present invention will, hereinafter, be described in detail with reference to Examples.

A viscosity decreasing rate as used in Examples is a value represented with a following equation. Measurement of a viscosity was performed at 25° C.

Viscosity decreasing rate (%)={($\mu'-\mu$)/$\mu'$}×100

$\mu$: a viscosity of a plastisol composition including a viscosity modifier, $\mu'$: a viscosity of a plastisol composition excluding only the viscosity modifier from the above-mentioned plastisol composition.

A method for manufacturing polymer particles, a method for film forming, and various evaluation methods in Examples are as described below.

All "part" in Examples represents a "part by mass."

<Method for Manufacturing Polymer Particles P1 and P2>

Into a four-necked flask having a capacity of 2 liters, equipped with a thermometer, a nitrogen gas introduction tube, a stirrer, a dropping funnel and a condenser tube, 500 parts of pure water was introduced, and nitrogen gas was passed therethrough for 30 minutes to replace dissolved oxygen in the pure water. After the passing of nitrogen gas was stopped, 25.0 parts of methyl methacrylate and 20.0 parts of n-butyl acrylate were introduced; the temperature was raised up to 80° C. with stirring at 200 rpm. When the inner temperature reached 80° C., 0.25 parts of potassium persulfate dissolved in pure water of 10.0 parts was added at once. Subsequently, a monomer emulsion (M1) shown in Table 1 was added dropwise into the reaction system, and stirring was further continued at 80° C. for 1 hour to obtain a resin dispersion liquid.

After cooling the obtained resin dispersion liquid to room temperature, spray drying was performed under the conditions of an inlet temperature of 170° C., an outlet temperature of 75° C., and an atomizer rotation number of 25000 rpm, using a spray dryer to obtain powdered polymer particles (P1).

Except for having used a monomer emulsion (M2) shown in a formulation in Table 1 instead of the monomer emulsion (M1), polymer particles (P2) were obtained in a similar manner as shown above.

<Preparation Method of Polymer Particles P3 to P5>.

Into a 4-necked flask having a capacity of 2 liters, equipped with a thermometer, a nitrogen gas introduction tube, a stirrer, a dropping funnel, and a condenser tube, 500 parts of pure water was introduced, and nitrogen gas was passed therethrough for 30 minutes to replace dissolved oxygen in pure water. After the passing of nitrogen gas was stopped, the temperature was raised up to 80° C. with stirring at 200 rpm. When the inner temperature reached 80° C., 0.25 parts of potassium persulfate dissolved in pure water of 10.0 parts was added at once. Subsequently, a monomer emulsion (M3) shown in a formulation in a Table 1 was added dropwise into the reaction system, and stirring at 80° C. was continued for 1 hour after stopping the dropwise addition to obtain an intended resin dispersion liquid.

After cooling the obtained resin dispersion liquid to room temperature, spray drying was performed under the conditions of an inlet temperature of 170° C., an outlet temperature of 75° C., and an atomizer rotation number of 25000 rpm, using a spray dryer to obtain resin powder (P3).

Except for having used monomer emulsions (M4) and (M5) shown in a formulation in a Table 1 instead of the monomer emulsion (M3), polymer particles (P4) and (P5) were respectively obtained in a similar manner as shown above.

<Preparation Method of Polymer Particles P6 and P7>

Into a four-necked flask having a capacity of 2 liters, equipped with a thermometer, a nitrogen gas introduction tube, a stirrer, a dropping funnel, and a condenser tube, 500 parts of pure water was introduced, and nitrogen gas was passed therethrough for 30 minutes to replace dissolved oxygen in pure water. After the passing of nitrogen gas was stopped, 25.0 parts of methyl methacrylate and 20.0 parts of n-butyl acrylate were introduced; the temperature was raised up to 80° C. with stirring at 200 rpm. When the inner temperature reached 80° C., 0.25 parts of potassium persulfate dissolved in pure water of 10.0 parts was added at once. Subsequently, a monomer emulsion (Mc6) shown in Table 2 was added dropwise into the reaction system. Stirring was further continued at 80° C. for 1 hour after stopping the dropwise addition, and then a monomer emulsion (Ms6) shown in a formulation in Table 2 was added dropwise. After stopping the dropwise addition, stirring was continued at 80° C. for 1 hour to obtain an intended resin dispersion liquid.

After cooling the obtained resin dispersion liquid to room temperature, spray drying was performed under the conditions of an inlet temperature of 170° C., an outlet temperature of 75° C., and an atomizer rotation number of 25000 rpm, using a spray dryer to obtain resin powder (P6).

Except for having used monomer emulsions (Mc7) and (Ms7) shown in a formulation in Table 2 instead of the monomer emulsions (Mc6) and (Ms6), polymer particles (P7) were obtained in a similar manner as shown above.

<Preparation Method of Polymer Particles P8 to P10>

Into a four-necked flask having a capacity of 2 liters, equipped with a thermometer, a nitrogen gas introduction tube, a stirrer, a dropping funnel, and a condenser tube, 500 parts of pure water was introduced, and nitrogen gas was passed therethrough for 30 minutes to replace dissolved oxygen in pure water. After the passing of nitrogen gas was stopped, the temperature was raised up to 80° C. with stirring at 200 rpm. When the inner temperature reached 80° C., 0.25 parts of potassium persulfate dissolved in pure water of 10.0 parts was added at once and then a monomer emulsion (Mc8) shown in a formulation in Table 2 was added dropwise. Then stirring was continued at 80° C. for 1 hour after stopping the dropwise addition, and a monomer emulsion (Ms8) shown in a formulation in Table 2 was added dropwise. After stopping the dropwise additiion, stirring was continued at 80° C. for 1 hour to obtain an intended resin dispersion liquid.

After cooling the obtained resin dispersion liquid to room temperature, spray drying was performed under the conditions of an inlet temperature of 170° C., an outlet temperature of 75° C., and an atomizer rotation number of 25000 rpm, using a spray dryer to obtain resin powder (P8).

Except for having used monomer emulsions (Mc9) and (Ms9) and monomer emulsions (Mc10) and (Ms10) shown in a formulation in Table 2 instead of the monomer emulsions (Mc8) and (Ms8) respectively, polymer particles (P9) and (P10) were obtained in a similar manner as shown above.

<Preparation Method of Polymer Particles P11 and P12>

After cooling to a room temperature of a resin dispersion liquid obtained using same method and composition as in obtaining the polymer particles (P1), a viscosity modifier (manufactured by Lion Corporation, brand name: Armeen 8D, having a structure of the formula (1) wherein alkyl group Y has an average carbon number of 8, each of V and X is a hydrogen atom) in an amount of 8.1 parts was mixed as shown in Table 3. Spray drying was performed under the conditions of an inlet temperature of 170° C., an outlet temperature of 75° C., and an atomizer rotation number of 25000 rpm, using a spray dryer to obtain powdered polymer particles (P11). The viscosity modifier was beforehand dissolved in Mineral Spirit A (a brand name, mineral turpentine by Nippon Oil Corporation) according to a ratio shown in Table 4, and was mixed into the resin dispersion liquid as an emulsion dispersed in water. Except for having mixed 16.1 parts of Armeen 8D instead of 8.1 parts, powdered polymer particles (P12) were obtained in a similar method as in the polymer particles (P11).

<Viscosity of a Plastisol Composition>

After keeping a plastisol composition warm for 3 hours in a temperature controlled bath at 25° C., a viscosity (unit: mPa-s) after 1 minute of rotation at 1 rpm was measured using an EHD type viscometer (made by Tokyo Keiki Co., Ltd., a product-name: EHD type viscometer, a rotor: Special cone (3° of cone angle)). Measured viscosity was classified as follows and shown in Tables.

A: Less than 5000 mPa-s
B: not less than 5000 mPa-s, less than 8000 mPa-s
C: not less than 8000 mPa-s, less than 10000 mPa-s
D: not less than 10000 mPa-s <Film Forming Conditions>

Using a knife coater, a plastisol composition was applied on a glass plate (2 mm in thickness) so that it would give 0.5 mm of film thickness after film forming, and was heated at 130° C. for 10 minutes in a gear oven to form a film.

<Non-Bleeding Out Property of a Film>

The appearance of the film obtained as mentioned above was evaluated by visual inspection and touch after the film had been left at room temperature for a week.
Not observed: no bleeding was observed;
Observed: bleeding was observed <Coloring of a Film>

A film formed as mentioned above was evaluated for the presence of coloring by visual inspection.

EXAMPLE 1

As Table 5 shows, 100 parts of polymer particles (P1), as a polymer; 2 parts of a primary amine (Lion Corporation, brand name: Armeen 8D), as a compound (B); and 80 parts of diisononyl phthalate (DINP) as a plasticizer were measured. After these were mixed under an atmospheric pressure (0.1 MPa) for 10 seconds using a vacuum mixer (manufactured by Thinky Corporation, product name: ARV-200), and then mixed for 50 seconds under a reduced pressure of 2.7 kPa to obtain a plastisol composition. The obtained plastisol composition had a viscosity of 4800 mPa-s.

EXAMPLES 2 to 39 and COMPARATIVE EXAMPLES 1 to 18

Plastisol compositions were obtained in a similar manner as in Example 1 except having used compositions and blendings indicated in Tables 5 to 17, respectively. Tables 5 to 17 show viscosities of the obtained plastisol compositions.

CONCERNING EXAMPLE 1 to 6 and COMPARATIVE EXAMPLE 1

In Examples 1 to 3 shown in Table 5, linear primary amines having alkyl groups with a different length are blended; in Examples 4 and 5, a linear tertiary amine and an alkyl diamine were blended, respectively; and in Example 6, an amine compound with 6-membered heterocyclic structure was blended.

For comparison, there is shown Comparative Example 1 wherein a polymer particles and a plasticizer that are identical as in Examples 1 to 6, but an amine compound was not blended.

Comparison of Examples 1 to 6 with Comparative Example 1 shows that a viscosity decreasing effect of a plastisol composition is very excellent by addition of an amine compound.

Comparison of Comparative Example 1 with Example 3 especially shows that a viscosity decreasing rate in case of Example 3 is very excellent to be 81%.

CONCERNING EXAMPLES 7 to 10

Examples 7 to 10 shown in Table 6 show a viscosity variation of a plastisol composition when varying an amount of addition of an amine compound. By comparing these Examples with Comparative Examples 1, an excellent viscosity decreasing effect is confirmed in each Example.

CONCERNING EXAMPLES 11 to 12 and COMPARATIVE EXAMPLES 3 to 4

Examples 11 to 12 shown in Table 7 are examples wherein the kind of the plasticizer was changed.

Comparisons of Example 11 with Comparative Example 3 and Example 12 with Comparative Example 4 confirmed development of a viscosity decreasing effect regardless of a plasticizer in each Example.

CONCERNING EXAMPLES 13 to 14 and COMPARATIVE EXAMPLES 5 to 6

Examples 13 and 14 shown in Table 8 are examples using a polymer with core/shell structure. Example 13 is an example using polymer particles having a high glass transition temperature, and Example 14 is an example using polymer particles having a low glass transition temperature. Each Example confirmed that a viscosity decreasing effect is developed.

CONCERNING EXAMPLES 15 and 16

Examples shown in Table 9 are examples wherein a viscosity modifier is beforehand added into a resin by blending the viscosity modifier with a resin dispersion liquid before drying and evaporating water and a mineral spirit added simultaneously with the viscosity modifier. They confirmed that a viscosity decreasing effect was developed regardless of an addition method of a viscosity modifier.

CONCERNING EXAMPLES 17 and 18 and COMPARATIVE EXAMPLE 7

Examples 17 and 18 shown in Table 10 used a polyether plasticizer, and as an amine, a polyoxyethylene alkylamine or an imidazoline derivative.

Examples 17 and 18, as compared with Comparative Example 7, confirmed development of a viscosity decreasing effect.

CONCERNING EXAMPLES 19 to 24 and COMPARATIVE EXAMPLE 8

Examples 19 to 21 shown in Table 11 are examples wherein an aluminum chelate compound was blended, Examples 22 and 23 are examples wherein a titan chelate compound was blended, and Example 24 is an example wherein a zirconium chelate compound was blended.

For comparison, there is shown Comparative Example 8 wherein polymer particles and a plasticizer identical as in Examples 19 to 24 are used, but a metal chelate compound was not blended.

Comparison of these Examples 19 to 24 with Comparative Example 8 shows that a viscosity decreasing effect of a plastisol composition was very excellent by addition of the metal chelate compound.

Especially, Example 19, as compared with Comparative Example 8, shows a very excellent viscosity decreasing rate of 82%.

CONCERNING EXAMPLES 25 to 28

Examples 25 to 28 shown in Table 12 are examples showing viscosity variation of plastisol compositions in variation of an amount of addition of a metal chelate compound. Comparison of these Examples with Comparative Examples 8 confirmed an excellent viscosity decreasing effect in each Example.

CONCERNING EXAMPLES 29 to 30 and COMPARATIVE EXAMPLES 10 to 11

Examples 29 to 30 shown in Table 13 are examples wherein a kind of a plasticizer was changed.

Comparisons of Example 29 with Comparative Example 10 and Example 30 with Comparative Example 11 confirmed that a viscosity decreasing effect was developed regardless of the plasticizer in each Example.

CONCERNING EXAMPLES 31 to 32 and COMPARATIVE EXAMPLES 12 to 13

Examples 31 to 32 shown in Table 14 are examples wherein a polymer particle composition and a kind of a plasticizer were changed.

Comparisons of Example 31 with Comparative Example 12 and Example 32 with Comparative Example 13 confirmed that a viscosity decreasing effect was developed regardless of the polymer particle composition and the kind of the plasticizer, in each Example.

CONCERNING EXAMPLES 33 to 35 and COMPARATIVE EXAMPLES 14 to 16

Examples 33 to 35 shown in Table 15 are examples using a polymer with a core/shell structure. Example 33 is an example using polymer particles having a shell of an acrylic polymer being constituted only with methyl methacrylate, and Examples 34 and 35 are examples using polymer particles having a shell of an acrylic polymer being constituted with methyl methacrylate and methacrylic acid. Comparisons of Example 33 with Comparative Example 14, Example 34 with Comparative Example 15, and Example 35 with Comparative Example 16 confirmed that a viscosity decreasing effect was developed regardless of the structure and the composition of the polymer and the kind of the plasticizer in each Example.

CONCERNING COMPARATIVE EXAMPLES 17 and 18

Comparative Examples 17 and 18 shown in Table 16 are examples using a hydroxy fatty acid/polyhydric alcohol ester as a viscosity modifier. Even an increase of an amount of an additive to 5 parts gave low viscosity decreasing effect as compared with a case of the viscosity modifier of the present invention. Moreover, the film had yellow coloring.

CONCERNING EXAMPLES 36 to 39

Examples 36 to 39 shown in Table 17 are examples using a carboxylic acid and a salt of carboxylic acid as a viscosity modifier. It was confirmed that a viscosity decreasing effect was developed regardless of the kind of the plasticizer, according to the present invention.

Besides, compounds in Tables are abbreviated as follows:
Emulsifier: Sodium dioctyl sulfosuccinate
MMA: Methyl methacrylate
EMA: Ethyl methacrylate
i-BMA: Isobutyl methacrylate
n-BMA: n-butyl methacrylate
MAA: Methacrylic-acid
Mineral Spirit A: Brand name. Mineral turpentine (manufactured by Nippon Oil Corporation)
Armeen 8D: Brand name. Linear primary amine (Structure of Formula (1): an alkyl group Y has an average carbon number of 8, each of V and X is a hydrogen atom, manufactured by Lion Corporation)
Armeen 12D: Brand name. Linear primary amine (Structure of Formula (1): an alkyl group Y has an average carbon number of 12, each of V and X is a hydrogen atom, manufactured by Lion Corporation)
Armeen 18D: Linear primary amine (Structure of Formula (1): an alkyl group Y has an average carbon number of 18, each of V and X is a hydrogen atom, manufactured by Lion Corporation)
Armeen $M_2O$: Brand name. Linear tertiary amine (Structure of the Formula (1): an alkyl group has an average carbon number of 14 to 18, manufactured by Lion Corporation)
Duomeen OX: Brand name. Linear alkyl diamine (Structure of Formula (2): an alkyl group Y has an average carbon number of 18, manufactured by Lion Corporation)
Amiet: Polyoxyethylene alkylamine (Structure of formula (3): an alkyl group Y has an average carbon number of 13, m+n is 2 in average manufactured by Kao Corporation, brand name: Amiet 105)
Homogenol: Imidazoline derivative (Structure of formula (4), R is a palmitoleyl group having 16 carbon atoms, and P is a 2-hydroxy ethyl group, A is $Cl^-$, manufactured by Kao Corporation, brand name: Homogenol L-95)
DINP: Diisononylphthalate
DOP: Di-2-ethylhexylphthalate
Mesamoll: Brand name. Phenylalkylsulfonate ester (manufactured by Beyer AG)
P-700: Polypropylene glycol, average molecular weight 700 (manufactured by Asahi Denka Co., Ltd., brand name: ADEKA Polyether P-700)
ALCH: Aluminium Di-i-propoxyethylacetoacetate (Kawaken Fine Chemicals Co., Ltd., brand name: ALCH)
Alumichelate A (W): aluminium Tris(acetylacetonate) (Kawaken Fine Chemicals Co., Ltd., brand name: Alumichelate A (W))
Alumichelate D: Aluminium monoacetyl acetonate bis (ethylacetoacetate) (Kawaken Fine Chemicals Co., Ltd., brand name: Alumichelate D)
TC-100: Titanium di-i-propoxy bis(acetylacetonate) (Matsumoto Chemical Industry Co., Ltd., brand name: TC-100)
TC-750: Titanium di-i-propoxy bis (ethylacetoacetate) (Matsumoto Chemical Industry Co., Ltd., brand name: TC-750)
ZC-540: Zirconium tri-n-butoxy acetylacetonate (Matsumoto Chemical Industry Co., Ltd., brand name: ZC-540)
ATBC: Acetyltributyl citrate (manufactured by Dainippon Ink & Chemicals Incorporated.)
DBP: Diisobutyl phthalate
CR-ED: Brand name. Condensed ricinoleic acid hexaglycerin ester (manufactured by Sakamoto Yakuhin Kogyo Co., Ltd.)
CR-500: Brand name. Condensed ricinoleic acid polyglycerin ester (manufactured by Sakamoto Yakuhin Kogyo Co., Ltd.)

TABLE 1

| Polymer particle | | Composition of monomer emulsion (part) | | | | |
|---|---|---|---|---|---|---|
| | | MMA | i-BMA | MAA | Pure water | Emulsifier |
| (P1) | (M1) | 470 | 280 | 10 | 400 | 7.5 |
| (P2) | (M2) | 750 | — | 10 | 400 | 7.5 |
| (P3) | (M3) | 420 | 330 | — | 400 | 7.5 |
| (P4) | (M4) | 750 | — | — | 400 | 7.5 |
| (P5) | (M5) | 729 | — | 21 | 400 | 7.5 |

TABLE 2

| Polymer particle | | Composition of monomer emulsion (part) | | | | | |
|---|---|---|---|---|---|---|---|
| | | MMA | n-BMA | EMA | MAA | Pure water | Emulsifier |
| (P6) | (Mc6) | 235 | 140 | — | — | 200 | 3.75 |
| | (Ms6) | 375 | — | — | — | 200 | 3.75 |
| (P7) | (Mc7) | 120 | 255 | — | — | 200 | 3.75 |
| | (Ms7) | 325 | — | 50 | — | 200 | 3.75 |
| (P8) | (Mc8) | 52 | 323 | — | — | 320 | 6 |
| | (Ms8) | 375 | — | — | — | 80 | 1.5 |
| (P9) | (Mc9) | 375 | — | — | — | 320 | 6 |
| | (Ms9) | 356 | — | — | 19 | 80 | 1.5 |
| (P10) | (Mc10) | 73 | 452 | — | — | 320 | 6 |
| | (Ms10) | 215 | — | — | 10 | 80 | 1.5 |

TABLE 3

| Polymer particle | | Composition of monomer emulsion (part) | | | | | Armeen 8D content (part) |
|---|---|---|---|---|---|---|---|
| | | MMA | i-BMA | MAA | Pure water | Emulsifier | |
| (P11) | (M11) | 470 | 280 | 10 | 400 | 7.5 | 8.1 |
| (P12) | (M12) | 470 | 280 | 10 | 400 | 7.5 | 16.1 |

TABLE 4

| | Formulation at the time of addition of viscosity modifier | | | |
|---|---|---|---|---|
| | Armeen 8D (part) | Mineral Spirit A (part) | Emulsifier (part) | Pure water (part) |
| (P11) | 8.1 | 72.9 | 0.8 | 81 |
| (P12) | 16.1 | 64.9 | 0.8 | 81 |

TABLE 5

|  |  |  | Example 1 | Example 2 | Example 3 | Example 4 | Example 5 | Example 6 | Comparative Example 1 | Comparative Example 2 |
|---|---|---|---|---|---|---|---|---|---|---|
| Composition (part) | Polymer | (P1) | 100 | 100 | 100 | 100 | 100 | 100 | 100 | 100 |
|  | Viscosity modifier | Armeen 8D | 2 |  |  |  |  |  |  |  |
|  |  | Armeen 12D |  | 2 |  |  |  |  |  |  |
|  |  | Armeen 18D |  |  | 2 |  |  |  |  |  |
|  |  | Armeen M2O |  |  |  | 2 |  |  |  |  |
|  |  | Duomeen OX |  |  |  |  | 2 |  |  |  |
|  |  | Pyridine |  |  |  |  |  | 2 |  |  |
|  | Plasticizer | DINP | 80 | 80 | 80 | 80 | 80 | 80 | 80 | 110 |
| Viscosity of plastisol composition (mPa·s) |  |  | 4800 A | 4000 A | 3600 A | 5000 B | 4500 A | 8200 C | 19000 D | 4500 A |
| Viscosity decreasing rate (%) |  |  | 75 | 79 | 81 | 74 | 76 | 57 | — | — |
| Non-bleeding property of film |  |  | Not observed | Not observed | Not observed | Not observed | Not observed | Not observed | Not observed | Observed |
| Coloring of film |  |  | Not observed | Not observed | Not observed | Not observed | Not observed | Not observed | Not observed | Not observed |

TABLE 6

|  |  |  | Example 7 | Example 8 | Example 9 | Example 10 |
|---|---|---|---|---|---|---|
| Composition (part) |  |  |  |  |  |  |
| Polymer | (P2) |  | 100 | 100 | 100 | 100 |
| Viscosity modifier | Armeen 12D |  | 0.005 | 0.01 | 5 | 8 |
| Plasticizer | DINP |  | 80 | 80 | 80 | 80 |
| Viscosity of plastisol composition (mPa·s) |  |  | 8800 C | 7900 B | 3500 A | 3200 A |
| Viscosity decreasing rate (%) |  |  | 54 | 58 | 82 | 83 |
| Non-bleeding property of film |  |  | Not observed | Not observed | Not observed | Not observed |
| Coloring of film |  |  | Not observed | Not observed | Not observed | Not observed |

TABLE 7

|  |  |  | Example 11 | Example 12 | Comparative Example 3 | Comparative Example 4 |
|---|---|---|---|---|---|---|
| Composition (part) |  |  |  |  |  |  |
| Polymer | (P1) |  | 100 | 100 | 100 | 100 |
| Viscosity modifier | Armeen 12D |  | 2 | 2 |  |  |
| Plasticizer | DOP |  | 80 |  | 80 |  |
|  | Mesamoll |  |  | 80 |  | 80 |
| Viscosity of plastisol composition (mPa·s) |  |  | 3000 A | 2800 A | 17700 D | 12800 D |
| Viscosity decreasing rate (%) |  |  | 83 | 78 | — | — |
| Non-bleeding property of film |  |  | Not observed | Not observed | Not observed | Not observed |
| Coloring of film |  |  | Not observed | Not observed | Not observed | Not observed |

TABLE 8

|  |  |  | Example 13 | Example 14 | Comparative Example 5 | Comparative Example 6 |
|---|---|---|---|---|---|---|
| Composition (part) |  |  |  |  |  |  |
| Polymer | (P6) |  | 100 |  | 100 |  |
|  | (P7) |  |  | 100 |  | 100 |
| Viscosity modifier | Armeen 12D |  | 2 | 2 |  |  |
| Plasticizer | DINP |  | 80 | 80 | 80 | 80 |
| Viscosity of plastisol composition (mPa·s) |  |  | 5500 B | 5000 B | 17900 D | 16000 D |
| Viscosity decreasing rate (%) |  |  | 69 | 69 | — | — |
| Non-bleeding property of film |  |  | Not observed | Not observed | Not observed | Not observed |
| Coloring of film |  |  | Not observed | Not observed | Not observed | Not observed |

TABLE 9

|  |  |  | Example 15 | Example 16 |
|---|---|---|---|---|
| Composition (part) | Polymer | (P11) | 100 |  |
|  |  | (P12) |  | 100 |
|  | Plasticizer | DINP | 80 | 80 |
| Viscosity of plastisol composition (mPa·s) |  |  | 6700 B | 4600 A |
| Viscosity decreasing rate (%) |  |  | 71 | 76 |
| Coloring of film |  |  | Not observed | Not observed |

TABLE 10

|  |  | Example 17 | Example 18 | Comparative Example 7 |
|---|---|---|---|---|
| Composition (part) |  |  |  |  |
| Polymer | (P2) | 100 | 100 | 100 |
| Viscosity modifier | Amiet | 2 |  |  |
|  | Homogenol |  | 2 |  |
| Plasticizer | P-700 | 80 | 80 | 80 |
| Viscosity of plastisol composition (mPa·s) |  | 8400 C | 7600 B | 19800 D |
| Viscosity decreasing rate (%) |  | 58 | 62 | — |

TABLE 10-continued

|  | Example 17 | Example 18 | Comparative Example 7 |
|---|---|---|---|
| Non-bleeding property of film | Not observed | Not observed | Not observed |
| Coloring of film | Not observed | Not observed | Not observed |

TABLE 11

|  |  |  | Example |  |  |  |  |  | Comparative Example |  |
|---|---|---|---|---|---|---|---|---|---|---|
|  |  |  | 19 | 20 | 21 | 22 | 23 | 24 | 8 | 9 |
| Composition (part) | Polymer | (P3) | 100 | 100 | 100 | 100 | 100 | 100 | 100 | 100 |
|  | Viscosity modifier | ALCH | 1 | — | — | — | — | — | — | — |
|  |  | Alumichelate A(W) | — | 1 | — | — | — | — | — | — |
|  |  | Alumichelate D | — | — | 1 | — | — | — | — | — |
|  |  | TC-100 | — | — | — | 1 | — | — | — | — |
|  |  | TC-750 | — | — | — | — | 1 | — | — | — |
|  |  | ZC-540 | — | — | — | — | — | 1 | — | — |
|  | Plasticizer | DINP | 80 | 80 | 80 | 80 | 80 | 80 | 80 | 110 |
| Viscosity of plastisol composition (mPa·s) |  |  | 3420 A | 4100 A | 4500 A | 6150 B | 5470 B | 6500 B | 19000 D | 4500 A |
| Viscosity decreasing rate (%) |  |  | 82 | 78 | 76 | 68 | 71 | 66 | — | — |
| Non-bleeding property of film |  |  | Not observed | Not observed | Not observed | Not observed | Not observed | Not observed | Not observed | Observed |
| Coloring of film |  |  | Not observed | Not observed | Not observed | Not observed | Not observed | Not observed | Not observed | Not observed |

TABLE 12

|  |  | Example 25 | Example 26 | Example 27 | Example 28 |
|---|---|---|---|---|---|
| Composition (part) |  |  |  |  |  |
| Polymer | (P3) | 100 | 100 | 100 | 100 |
| Viscosity modifier | ALCH | 0.005 | 0.1 | 5 | 8 |
| Plasticizer | DINP | 80 | 80 | 80 | 80 |
| Plastisol composition viscosity (mPa·s) |  | 8910 C | 5130 B | 3350 A | 3270 A |
| Viscosity decreasing rate (%) |  | 53 | 73 | 82 | 83 |
| Non-bleeding property of film |  | Not observed | Not observed | Not observed | Not observed |
| Coloring of film |  | Not observed | Not observed | Not observed | Not observed |

TABLE 13

|  |  | Example 29 | Example 30 | Comparative Example 10 | Comparative Example 11 |
|---|---|---|---|---|---|
| Composition (part) |  |  |  |  |  |
| Polymer | (P3) | 100 | 100 | 100 | 100 |
| Viscosity modifier | ALCH | 1 | 1 | — | — |
| Plasticizer | DOP | 80 | — | 80 | — |
|  | Mesamoll | — | 80 | — | 80 |
| Viscosity of plastisol composition (mPa·s) |  | 3400 A | 2300 A | 17700 D | 12800 D |
| Viscosity decreasing rate (%) |  | 81 | 82 | — | — |
| Non-bleeding property of film |  | Not observed | Not observed | Not observed | Not observed |
| Coloring of film |  | Not observed | Not observed | Not observed | Not observed |

TABLE 14

|  |  | Example 31 | Example 32 | Comparative Example 12 | Comparative Example 13 |
|---|---|---|---|---|---|
| Composition (part) |  |  |  |  |  |
| Polymer | (P4) | 100 | — | 100 | — |
|  | (P5) | — | 100 | — | 100 |
| Viscosity modifier | ALCH | 1 | 1 | — | — |
| Plasticizer | ATBC | 80 | — | 80 | — |
|  | DBP | — | 80 | — | 80 |
| Viscosity of plastisol composition (mPa·s) |  | 3100 A | 3500 A | 18900 D | 19800 D |
| Viscosity decreasing rate (%) |  | 84 | 82 | — | — |

TABLE 14-continued

|  | Example 31 | Example 32 | Comparative Example 12 | Comparative Example 13 |
|---|---|---|---|---|
| Non-bleeding property of film | Not observed | Not observed | Not observed | Not observed |
| Coloring of film | Not observed | Not observed | Not observed | Not observed |

TABLE 15

| | | | Example 33 | Example 34 | Example 35 | Comparative Example 14 | Comparative Example 15 | Comparative Example 16 |
|---|---|---|---|---|---|---|---|---|
| Composition (part) | Polymer | (P8) | 100 | — | — | 100 | — | — |
| | | (P9) | — | 100 | — | — | 100 | — |
| | | (P10) | — | — | 100 | — | — | 100 |
| | Viscosity modifier | ALCH | 1 | 1 | 1 | — | — | — |
| | Plasticizer | DINP | 80 | — | 80 | 80 | — | 80 |
| | | ATBC | — | 80 | — | — | 80 | — |
| Plastisol composition viscosity (mPa·s) | | | 3220 | 3000 | 3400 | 17900 | 16000 | 18700 |
| | | | A | A | A | D | D | D |
| Viscosity decreasing rate (%) | | | 82 | 81 | 82 | — | — | — |
| Non-bleeding property of film | | | Not observed | Not observed | Not observed | Not observed | Not observed | Not observed |
| Coloring of film | | | Not observed | Not observed | Not observed | Not observed | Not observed | Not observed |

TABLE 16

| | | | Comparative Example 17 | Comparative Example 18 |
|---|---|---|---|---|
| Composition (part) | Polymer | (P1) | 100 | 100 |
| | Viscosity modifier | CR-ED | 5 | — |
| | | CR-500 | — | 5 |
| | Plasticizer | DINP | 80 | 80 |
| Plastisol composition viscosity (mPa·s) | | | 10600 | 10500 |
| | | | D | D |
| Viscosity decreasing rate (%) | | | 44 | 45 |
| Non-bleeding property of film | | | Not observed | Not observed |
| Coloring of film | | | Observed | Observed |

TABLE 17

| | | | Example 36 | Example 37 | Example 38 | Example 39 |
|---|---|---|---|---|---|---|
| Composition (part) | | | | | | |
| Polymer | (P1) | | 100 | 100 | 100 | 100 |
| Viscosity modifier | Octyl acid | | 2 | — | 2 | — |
| | Zinc octylate | | — | 4 | — | 4 |
| Plasticizer | DINP | | 80 | 80 | | |
| | ATBC | | | | 80 | 80 |
| Plastisol composition viscosity (mPa·s) | | | 9000 | 3800 | 8200 | 3400 |
| | | | C | A | C | A |
| Viscosity decreasing rate (%) | | | 53 | 80 | 57 | 82 |
| Non-bleeding property of film | | | Not observed | Not observed | Not observed | Not observed |
| Coloring of film | | | Not observed | Not observed | Not observed | Not observed |

EXAMPLE 40

Slush molding was performed using a metal mold in the shape of a doll and using a plastisol composition obtained in Example 33. In the method of slush molding, after charging the plastisol composition to the metal mold, the metal mold was immersed in a 160-degree C. oil bath for 5 seconds to form a gelled layer, and excessive plastisol composition was discharged from the metal mold. Further, the gelled layer attached to the metal mold was melted at in 160 degree C.×5 minutes, and then after cooling to 50° C., a molded article was taken out from the metal mold.

The obtained molded article had no coloring and no bleeding of a plasticizer, and was usable as a doll type toy.

INDUSTRIAL APPLICABILITY

As described in detail above, a viscosity modifier for plastisol compositions of the present invention has outstanding effect of reducing viscosity of a plastisol. A plastisol composition including the viscosity modifier has a low viscosity without including a large amount of plasticizers or diluents, does not impair mechanical strength of cured article, and suppresses volatilization of organic substances. Effects of the viscosity modifier of the present invention is valid for any plasticizers. Owing to this low viscosity, it is possible to obtain films and molded products from the plastisol composition at low costs, and prevent coloring thereof. Therefore, the present invention has very remarkable effect in industrial significance and global environment conservation.

The invention claimed is:

1. A viscosity modifier for a plastisol composition containing a (meth)acrylic polymer, comprising at least one selected from the group consisting of compounds (A1) and (C):
   (A1) zinc octylate or sodium laurate; and
   (C) a metal chelate compound.

2. The viscosity modifier for a plastisol composition according to claim 1, wherein the metal chelate compound (C) is at least one metal chelate compound selected from the group consisting of an aluminum chelate compound, a titanium chelate compound and a zirconium chelate compound.

3. A plastisol composition comprising a (meth)acrylic polymer and at least one selected from the group consisting of compounds (A1) and (C):
(A1) zinc octylate or sodium laurate and
(C) a metal chelate compound.

4. The plastisol composition according to claim 3, comprising an acrylic polymer.

5. The viscosity modifier for a plastisol composition according to claim 1, comprising zinc octylate.

6. The viscosity modifier for a plastisol composition according to claim 1, comprising sodium laurate.

7. The viscosity modifier for a plastisol composition according to claim 1, comprising a metal chelate compound.

8. The viscosity modifier for a plastisol composition according to claim 1, comprising at least one metal chelate compound (C) selected from the group consisting of an aluminum chelate compound, a titanium chelate compound and a zirconium chelate compound.

9. The plastisol composition according to claim 3, comprising zinc octylate.

10. The plastisol composition according to claim 3, comprising sodium laurate.

11. The plastisol composition according to claim 3, comprising a metal chelate compound.

12. The plastisol composition according to claim 3, comprising at least one metal chelate compound (C) selected from the group consisting of an aluminum chelate compound, a titanium chelate compound and a zirconium chelate compound.

13. The plastisol composition according to claim 3, comprising a zirconium chelate compound.

14. A product comprising a substrate and a covering layer, wherein said covering layer is obtained by heating the plastisol composition according to claim 3.

15. A molded article prepared by heating the plastisol composition according to claim 3.

16. The viscosity modifier for a plastisol composition according to claim 1, wherein the total content of compounds (A1) and (C) in the viscosity modifier is 0.0001 parts by mass to 30 parts by mass with respect to 100 parts by mass of the polymer.

17. The viscosity modifier for a plastisol composition according to claim 1, wherein the (meta)acrylic polymer has a weight average molecular weight of 10,000 to 5,000,000.

18. The plastisol composition according to claim 3, wherein the total content of compounds (A1) and (C) is 0.0001 parts by mass to 30 parts by mass with respect to 100 parts by mass of the polymer.

19. The plastisol composition according to claim 3, wherein the (meta)acrylic polymer has a weight average molecular weight of 10,000 to 5,000,000.

* * * * *